Figure 1:
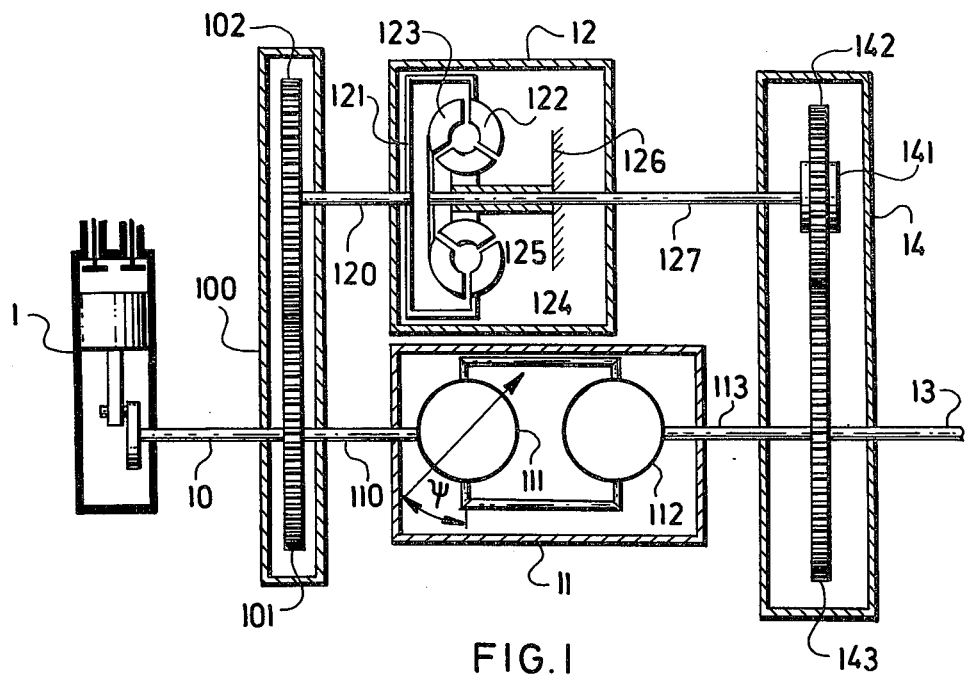

United States Patent [19]

Rasman et al.

[11] 4,147,075
[45] Apr. 3, 1979

[54] COMBINED GEARBOX WITH STEPLESS VARIABLE SPEED RATIO

[75] Inventors: Stefan Rasman; Pavol Hegedus; Pavol Habarda, all of Martin, Czechoslovakia

[73] Assignee: Turcianske Strojarne, Martin, Czechoslovakia

[21] Appl. No.: 815,711

[22] Filed: Jul. 14, 1977

[51] Int. Cl.² .................... F16H 47/00; F16H 37/06
[52] U.S. Cl. .................................. 74/720; 74/665 P; 74/720.5
[58] Field of Search ............... 74/720, 665 P, 718, 74/732, 720.5

[56] References Cited

U.S. PATENT DOCUMENTS

| | | | |
|---|---|---|---|
| 2,949,793 | 8/1960 | Suri | 74/720 X |
| 3,534,635 | 10/1970 | Polak | 74/720.5 |
| 3,593,596 | 7/1971 | Race et al. | 74/720 |
| 3,750,493 | 8/1973 | Allsup, Sr. | 74/720 |
| 3,990,327 | 11/1976 | Margolin | 74/720 X |

*Primary Examiner*—Leonard H. Gerin
*Attorney, Agent, or Firm*—Burgess, Ryan and Wayne

[57] ABSTRACT

A stepless variable speed gearbox employing a parallel combination of a hydrodynamic drive and a variable speed drive, with a coupling arrangement including an overrunning or disconnecting clutch to disconnect the hydrodynamic drive when the variable speed drive comes up to a given speed.

3 Claims, 2 Drawing Figures

COMBINED GEARBOX WITH STEPLESS VARIABLE SPEED RATIO

This invention relates to a combined gearbox with stepless variable speed ratio, designated especially for mobile machines containing both a gearbox with variable speed drive and a gearbox with hydrodynamic drive.

At present, a series of gearboxes with variable speed ratio is used. Generally, two principal structural groups are considered, namely gearboxes with variable speed drive utilizing mechanical, electral, or hydrostatic speed conversion units, or gearboxes with hydrodynamic drive utilizing a hydrodynamic torque converter.

The advantage of the gearbox with speed conversion driving unit rests in the possibility of stepless change of gear ratio independent of load, in good stability of the chosen gear ratio in the case of a fluctuating load, and in relatively good efficiency over a wide control range. Its disadvantage lies in the necessity of designing it to handle the maximum torque which can occur in the control range desired. This results in the necessity for designing variable-speed gearboxes having rated outputs which are considerably higher than those of the driving unit. These higher rated outputs are accompanied by relatively great weight which results in higher costs. Because of infrequent exploitation of the rated output of the unit the efficiency thereof is less than the optimum efficiency of said unit.

Therefore the variable-speed gearboxes are mostly used with equipment with smaller rated outputs or with equipment wherein the maximum torque is proportional to the maximum output speed, as for example with pumps, fans ship-propellers and the like. Their use with mobile machines as for instance with motor-cars and locomotives is not too effective.

With the second group of gearboxes, i.e. with gearboxes with hydrodynamic drive, the speed ratio changes with load and cannot be controlled as desired, as in the case of gearboxes with variable speed conversion drive. Their further disadvantage rests in relatively low efficiency, especially within the range of greater slippage in a hydrodynamic converter, and sometimes even their self-controlling property. On the other hand, their advantages lies in their ability to transfer high power levels with relatively small dimensions, and in their suitability for equipment encountering frequent load changes.

Finally, there are known designs utilizing gearboxes with combined drives, both variable speed conversion drive and hydrodynamic drive, where the operating modes of the equipment are divided into a mode with a variable-speed conversion driving unit and a mode with hydrodynamic drive. However, these combinations do not remove the disadvantages of individual drives at the outlet of the gearbox, as mentioned above.

It is an object of the present invention to provide a combined gearbox optimally utilizing the advantageous properties of known individual types of gearboxes with simultaneous restriction of the influence of their disadvantages to minimum.

According to the invention there is provided a combined gearbox with stepless variable speed ratio, especially for mobile machines containing both a gearbox with variable speed conversion driving unit and a gearbox with hydrodynamic drive, wherein both gearboxes are connected in parallel to a driving unit, and in coupling their outlet shafts via an outlet gear, rotationally one of the members of the rotary coupling, with advantage the driven gear of said outlet gear, being furnished with a disconnecting clutch, namely with a free-wheel clutch.

Because of parallel connection of both the gearboxes with hydrodynamic and variable speed conversion driving units, using mechanical coupling between their outlet shafts, and due to utilization of a free-wheel clutch, it is possible to realize a design exhibiting, when compared with known designs, a permanent improvement of the meshing properties of the unit and in maintaining dimensions which are proportional to maximum output to be transferred. This results also in meeting the requirements for improvement of both the efficiency and character of torque transmissions, which advantages appear especially with mobile machines, for example with locomotives, heavy lorries and the like.

Figure 2:
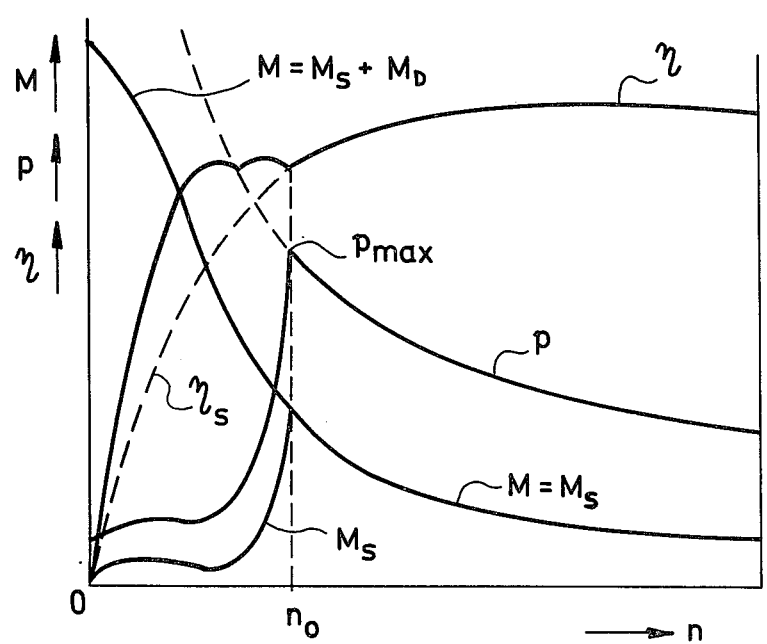

An embodiment of the invention will now be described, by way of example, with reference to the accompanying drawing, in which FIG. 1 is a mechanical/hydraulic schematic diagram which shows a unit with mechanically coupled output shafts with the capability of disconnecting them, and FIG. 2 shows a graphical diagram of some principal parameters of the unit of FIG. 1.

Referring to FIG. 1., the unit shown consists of a driving unit 1 having an outlet shaft 10 connected via an input gear 100 to the input shaft 110 of a gearbox 11 furnished with variable speed conversion drive, and to an inlet shaft 120 of a gearbox 12 furnished with hydrodynamic drive. The output shafts 113 and 127 of said gearboxes 11 and 12 are mechanically interconnected by means of a gear 14.

As shown in FIG. 1., the output shaft 10 of the driving unit 1 is connected to the input shaft 110 of the gearbox 11 provided with the variable speed conversion driving unit, said gearbox 11 consisting of both a regulating pump 111 with a control means (not shown) which pump 111 can be adjusted to various positions with the functional angle $\psi$, and of a hydromotor 112 with an output shaft 113 connected to a driven shaft 13 of the gearbox.

Further, the driving unit 1 is mechanically coupled via a driving gear 101 and a driven gear 102, with the input shaft 120 of the gear box 12 provided with a hydrodynamic drive. The input shaft 120 is connected via a driving frame 121 with a pumping part 22 of a hydrodynamic converter the turbine part 123 of which is connected to the output shaft 127. The converter also has a reactor 124 coupled via overrunning or disconnecting clutch 125 with fixed frame 126 of the gearbox. A driving gear 142 is mounted on the output shaft 127 by means of the overrunning clutch 141. The driving gear 142 meshes with the driven gear 143 of an output gear unit 14 which driven gear 143 is mounted on the driven shaft 13 of the combined gearbox, wherein the driven shaft 13 is functionally coupled to the output shaft 113.

FIG. 2 shows the variation of pressure p of the working medium in the gearbox 11 with variable speed drive in dependence upon the speed n of the driven shaft 13, further the variation of the resulting torque M on the driven shaft 13 and the variation of a partial torque $M_s$ on the driven shaft 13 from the hydrostatic part of the gearbox, and finally it shows the total efficiency $\eta$ of the gearbox as a function of speed (r.p.m.). In dash-lines there is shown the variation of efficiency $\eta_s$ of the variable speed drive itself, and the variation in pressure p in case of using it as the only unit of the gearbox transferring in full extent the torque from the driving unit 1 to the drive shaft 13 of the gearbox.

The operation of the gearbox shown in FIG. 1 is as follows. At the very beginning the functional angle $\psi$ of the regulating means of the regulating pump 111, for example, the angle of inclination of the swash supporting plate of an axial multicylinder piston pump, equals zero; thus the rotational speed n of the driven shaft 13 equals zero so that the pressure p inside the unit and the torque $M_s$ on the driven shaft 13 of the hydrostatic part of the gearbox are minimum, as is evident in FIG. 2. At the same time the pumping part 122 of the gearbox 12 with hydrodynamic drive is driven via an input gear 100, input shaft 120 and driving frame 121, while its turbine part 123 is coupled via the input shaft 127 and output gear 14 with the driven shaft 13. Thus its speed equals zero, too, so that the partial torque $M_D$ on the driven shaft 13 from the gearbox 12 with hydrodynamic converter has its own maximum value as is evident from the difference of curves M and $M_s$ ($M_D=M-M_s$) in FIG. 2. This means that the torque is transferred from the driving unit 1 to the driven shaft 13 of the gearbox with as great a multiplication factor as possible. Thus the conditions for starting for example a mobile unit provided with the gearbox herein described are optimum.

Increasing the angle $\psi$ results in also increasing the quantity of working medium supplied by the regulating pump 111 of the hydromotor 112, which further results in increasing the speed n of the driven shaft 13, and with regard to the connection by means of the output gear, the difference in speed between the pumping part 122 and the turbine part 123 of the gearbox 12 decreases. Simultaneously the partial torque $M_D$ on the driven shaft 13 from said gearbox 12 starts diminishing. At the same time the working pressure p of the hydrostatic system increases, so that the hydrostatic system starts transferring a part of the torque, following the curve $M_s$. When the angle $\psi$ is increased, thus increasing the speed n, the hydrostatic system takes over a greater and greater part of the torque transfer.

When a given speed $n_o$ is reached, the speed of both the pumping part 122 and the turbine part 123 of the gearbox 12 with hydrodynamic drive are euqal, and the gearbox 12 stops multiplying and transferring the torque from the output shaft 10 of the driving unit 1, which torque is then completely transferred by the gearbox 11 with variable-speed conversion drive.

When the angle $\psi$ further increased, the speed n increases so that the driving gear 142 of the output gear 14 rotates faster than the output shaft 127. In such a case the overrunning clutch 141 becomes effective and the mechanical coupling of output shafts 113 and 127 is interrupted.

The speed $n_o$ at which the coincidence of speeds of the mentioned parts of the gearbox 12 provided with the hydrodynamic drive occurs can be defined by a choice of gears through either gears 101, 102 or 142, 143 so as to provide the required efficiency $\eta_s$ of the variable-speed conversion drive, or the maximum required pressure $P_{max}$ of the system and the like.

It is also possible to choose the speed $n_o$ to be coincident with maximum speed of the output shaft 113 of the gearbox, so that the coordinate $n_o$ in FIG. 2 moves up to the right-hand margin of the diagram. In such a case cooperation of both partial gearboxes over the entire speed range is achieved.

It is obvious that the design of the gearbox proper can vary as to structural and functional equivalents. Thus, for example, the gearbox 11 with variable-speed conversion drive can be readily replaced by a mechanical speed conversion unit, the output gear 14 can be made in the form of a epicyclic gear, and the like. Also the overrunning clutch 141 can be replaced, without any effect on the operation of the system, by some other bype of disconnecting coupling, e.g. by a multiple disc clutch or a claw clutch, and can be controlled either mechanically or electrically in dependence upon the speed n of the outlet shaft 113. The advantage rests in the fact that said clutch 141 or its equivalent are connected and disconnected in case of coincidence of speeds, thus in case of minimum or zero torque to be transferred.

The combined gearbox according to the invention can be utilized with advantage in mobile machines, as for example with lorries and other vehicles, tractors, locomotives, civil and building machines.

A variable speed drive suitable for use as the gear box 11 is the hydrostatic variable speed drive HMT 250 of General Electric Company, described in Society of Automotive Engineers reprint No. 670,932 (1968). A suitable hydrodynamic drive for use as the gear box 12 is a hydrodynamic torque converter commonly used with gear boxes of the power-shift type, manufactured e.g., by Allis-Chalmers Company. Also of general interest is the arrangement described in U.S. Pat. No. 3,534,635 relating to a combined gear box using both a varaible speed drive and a hydrodynamic torque converter.

What is claimed is:

1. A combination gear box having a stepless variable speed ratio comprising:
    an input driving member;
    a first gearbox comprising a variable-speed conversion driving unit having input and output shafts and exhibiting a controlled variation speed ratio between said shafts;
    a second gearbox comprising a hydrodynamic drive and having input and output shafts and containing a hydrodynamic torque converter;
    means connecting said input driving member to both of said input shafts;
    a disconnecting clutch coupled between said output shafts;
    an output driven member; and
    means for connecting the output driven member to both said output shafts that are coupled via said disconnecting clutch.

2. A combination gearbox having a stepless variable speed ratio, comprising:
    an input driving member;
    a first gearbox comprising a variable-speed conversion driving unit having input and output shafts and exhibiting a torque multiplication factor between said shafts which increases with increasing speed in a predetermined range of speeds;
    a second gearbox comprising a hydrodynamic drive and having input and output shafts with a torque multiplication factor between said shafts which decreases with increasing speed in said predetermined range of speeds;
    means connecting said driving member to both of said input shafts;
    an overrunning clutch coupled between said output shafts;

a first output gear connected to the output shaft of said first gearbox; and a second output gear connected to said first output gear, said second output gear being coupled to the output shaft of said second gearbox through said overrunning clutch.

3. The gearbox according to claim 2, wherein the ratio of said output gears being such that when said overrunning clutch is engaged the output shaft of said second gearbox rotates at a higher speed than the output shaft of said first gearbox.

* * * * *

UNITED STATES PATENT OFFICE
CERTIFICATE OF CORRECTION

Patent No. 4,147,075     Dated April 3, 1979

Inventor(s) Stefan Rasman, et al

It is certified that error appears in the above-identified patent and that said Letters Patent are hereby corrected as shown below:

Column 1, line 13: "electral" should be --electrical--.

line 35: After "fans" insert a comma.

Column 3, line 45: "euqal" should be --equal--.

Column 4, line 9: "bype" should be --type--.

line 31: "varaible" should be --variable--.

Signed and Sealed this

Ninth Day of October 1979

[SEAL]

Attest:

RUTH C. MASON
Attesting Officer

LUTRELLE F. PARKER
Acting Commissioner of Patents and Trademarks